United States Patent [19]

Hoxmeier et al.

[11] Patent Number: 5,618,903
[45] Date of Patent: Apr. 8, 1997

[54] ANIONICALLY POLYMERIZED BLOCK COPOLYMERS OF ETHYLENE AND CYCLIC SILOXANE MONOMERS

[75] Inventors: Ronald J. Hoxmeier; Donn A. DuBois; Jeffrey G. Southwick, all of Houston, Tex.

[73] Assignee: Shell Oil Company, Houston, Tex.

[21] Appl. No.: 634,078

[22] Filed: Apr. 17, 1996

Related U.S. Application Data

[63] Continuation-in-part of Ser. No. 465,998, Jun. 6, 1995, abandoned.

[51] Int. Cl.$^6$ .................................................. C08G 77/442
[52] U.S. Cl. ............................ 528/14; 528/25; 525/106
[58] Field of Search .................................. 525/105, 106; 528/14, 25

[56] References Cited

U.S. PATENT DOCUMENTS

| | | | |
|---|---|---|---|
| 3,665,052 | 5/1972 | Saam et al. | 525/479 |
| 3,691,257 | 9/1972 | Kendrich et al. | 525/479 |
| 4,425,176 | 1/1984 | Shibano et al. | 156/244.11 |
| 5,229,179 | 7/1993 | Kumar et al. | 428/40 |

FOREIGN PATENT DOCUMENTS

| | | |
|---|---|---|
| 0484093A2 | 10/1991 | European Pat. Off. |
| 63101-428-A | 5/1988 | Japan. |
| 05032830-A | 2/1993 | Japan. |
| 1376446 | 6/1972 | United Kingdom. |

*Primary Examiner*—Ralph H. Dean

[57] ABSTRACT

This invention relates to anionically polymerized block copolymers comprised of at least one block polyethylene and at least one block of a polymerized cyclic siloxane monomer, e.g., polydimethylsiloxane. Block copolymers with multiple "arms" may be formed by coupling these living diblocks with polyfunctional coupling agents. One copolymer for use in wax release coatings has an overall weight average molecular weight of 1500 to 100,000, a polyethylene block weight average molecular weight of less than 4100, and a polyethylene content of less than 55 percent by weight. Another copolymer for use in extruded release coating films prepared by blending the copolymer with a film grade polymer has an overall molecular weight of less than 20,000 and a polyethylene block molecular weight of less than 3700.

21 Claims, No Drawings

ANIONICALLY POLYMERIZED BLOCK COPOLYMERS OF ETHYLENE AND CYCLIC SILOXANE MONOMERS

This is a continuation-in-part of application Ser. No. 08/465,998, filed Jun. 6, 1995, now abandoned.

BACKGROUND OF THE INVENTION

This invention relates to block copolymers of ethylene and cyclic siloxane monomers which are made by anionic polymerization. The invention also relates to an anionic process for making such block copolymers.

Linear block copolymers of polystyrene and polydimethylsiloxane have been synthesized, both by graft and block copolymerization. In block copolymerization of such linear polymers, polystyrene is produced by anionic polymerization with an organo lithium initiator and the living polymer ($PS^-$ $Li^+$) created thereby is reacted with hexamethylcyclotrisiloxane, $(Me_2SiO)_3$, in the presence of a polar promoter wherein a block of polydimethylsiloxane grows on the end of the living vinyl aromatic hydrocarbon polymer block. These polymers are useful for impact modification of engineering thermoplastics and forming coatings with low energy surfaces.

Graft copolymers of polyethylene and polydimethylsiloxanes have been produced. They comprise a soft block of vinylmethylsiloxane and dimethylsiloxane monomer units. Polyethylene blocks grafted by free radical copolymerization of ethylene with the pendant vinyl groups of the polysiloxane or by Ziegler-Natta copolymerization of ethylene with the pendant vinyl groups as described in Japanese published patent application JP 05032830A and *Makromol. Chem.*, 190(10), 2373–80. However, both synthesis techniques can be expected to lead to polymerization of significant quantities of homopolyethylene in parallel to the desired graft polymerization due to extensive chain termination and chain transfer reactions which are characteristic of these two polymerization processes. Thus, these methods have the disadvantages of producing impure products, products of relatively high molecular weight (hence, much higher solution and melt viscosities) and products with structures that are not well-defined.

Linear diblock polymers of polyethylene (PE) and polydimethylsiloxane (PDMS) have also been produced as described in British Patent No. 1376446. These materials were prepared by sequential anionic polymerization of butadiene and $(MeSiO)_3$ ($D_3$) to give polybutadiene (PBD) - PDMS block copolymers. However, these materials have the disadvantage that the PBD-PDMS precursors must by hydrogenated to give PE-PDMS polymers. A hydrogenation catalyst removal step is then required and thus four process steps are required to obtain the desired PE-PDMS copolymers. They suffer from the further disadvantage that the resulting PE blocks are low density polyethylene (LDPE) because the anionic polymerization of butadiene is known to give 6–8% branching in the polymer backbone (hence, 6–8% comonomer and thus LDPE). This limits the crystallinity and melting point (M.P.) of the PE block in the PE-PDMS block copolymer and thus limits the strength of the materials and their upper use or service temperatures.

Thus, it can be seen that it would be advantageous to be able to produce a block copolymer with saturated blocks without hydrogenation. It also would be advantageous to be able to produce such a polymer with blocks that exhibit the high level of crystallinity and high melting point of high density polyethylene and thus have higher strength and service temperature capability than the (PBD) - PDMS copolymers discussed above. Finally, it would be advantageous to produce such polymers that are relatively pure and low in molecular weight and have well-defined structures (graft or comb polymers vs. precise linear diblocks, triblocks, or radial polymers of this invention). The present invention describes a process which meets the needs discussed above and produces a polymer with the desired characteristics.

Ethylene has long been known to polymerize anionically as described in *Journal of Applied Polymer Science*, Vol. 42, 533–41 (1991) but many difficulties and limitations of this process for making useful materials have been reported. For example, at a degree of polymerization of about $C_{40}$, the growing living PE-Li chains precipitate from solution and seriously retard the rate of polymerization. Furthermore, the mole weights of the PE so obtained generally plateau at about 2000 to 3000 and it is only with great difficulty that MWs in the 5000 to 8000 range can be obtained effectively limiting the practical MW ceiling to less than 10,000. PE block copolymers with PE MWs in the 2000 to 10,000 MW range are generally poor elastomers. It appears that the hard block MW should exceed 10,000 for good elastomeric properties and preferably should be in the 20,000 to 30,000 range. These disadvantages of anionic ethylene polymerization (syntheses and properties limitations) have contributed to the lack of success until now in developing useful syntheses, materials, and applications based on this technology.

SUMMARY OF THE INVENTION

The present invention describes a unique application of anionic ethylene polymerization in combination with polysiloxanes which does not suffer from the previously described limitations of anionic ethylene polymerization. Further, the materials so obtained show superior properties vs. prior art materials (high melting points, easily dissolved and handled in solution, precise structures, and low viscosities as well as being chemically pure, i.e., essentially free of homo-PE and homo-PDMS).

The present invention is an anionically polymerized block copolymer which is comprised of at least one block of high density (HDPE) polyethylene and at least one block of a polysiloxane, e.g., polydimethylsiloxane. A diblock polymer may be made or two or more living diblocks may be coupled together with a difunctional coupling agent. Block copolymers with multiple "arms" may be formed by coupling these living diblocks with polyfunctional coupling agents. So-called "radial" polymers are formed with tri-, tetra-, and polyfunctional coupling agents.

The present invention also encompasses a process for making the block copolymers discussed above. This process comprises first anionically polymerizing ethylene by contacting ethylene with RLi initiator in the presence of chelating amine promoters. The next step comprises polymerizing sequentially cyclosiloxane monomers (e.g., $D_3$, $D_4$, $D_5$, etc.) in the presence of polar promoters such as cyclic ethers, diethers and polyamines, e.g., N,N,N',N'-tetramethylethylene diamine (TMEDA). The final step optionally recovers the polymer directly to give PE-PDMS-$O^-Li^+$, capping the polymer with, e.g., $Me_3SiCl$ to give PE-PDMS-$SiMe_3$, protonating the polymer with, e.g., acetic acid to give PE-PDMS-OH, or coupling the polymer with, e.g., $Me_2SiCl_2$ to give PE-PDMS-PE product.

DETAILED DESCRIPTION OF THE INVENTION

In general, when solution anionic techniques are used, polymers of anionically polymerizable monomers are prepared by contacting the monomer to be polymerized simultaneously or sequentially with an anionic polymerization initiator such as Group IA metals, their alkyls, amides, silanolates, naphthalides, biphenyls and anthracenyl derivatives. It is preferable to use an organo alkali metal (such as sodium or potassium) compound in a suitable solvent at a temperature within the range from −150° C. to 300° C., preferably at a temperature within the range from 0° C. to 100° C. Particularly effective anionic polymerization initiators are organo lithium compounds having the general formula:

$$RLi_n$$

wherein:

R is an aliphatic, cycloaliphatic, aromatic or alkyl-substituted aromatic hydrocarbon radical having from 1 to 20 carbon atoms; and n is an integer of 1–4.

In general, any of the solvents known in the prior art to be useful in the preparation of such polymers may be used. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted derivatives thereof; aromatic and alkyl-substituted aromatic hydrocarbons such as benzene, napthalene, toluene, xylene and the like; hydrogenated aromatic hydrocarbons such as tetralin, decal in and the like; linear and cyclic ethers such as methyl ether, methyl ethyl ether, diethyl ether, tetrahydrofuran and the like.

Ethylene may be polymerized as described above with the addition that it is usually best to include a promoter, such as a diamine, to facilitate the reaction. Examples of these amines which include but are not limited to follow: N,N,N',N'-tetramethylmethylenediamine (TMMDA), N,N,N',N'-tetramethylethylenediamine (TMEDA), N,N,N',N'-tetraethylethylenediamine (TEEDA), N,N,N',N'-tetramethyl-1,3-propanediamine (TMPDA), N,N,N',N'-tetramethyl-1,4-butanediamine (TMBDA), dipiperidinomethane (DIPIM), 1,2-dipiperidinoethane (DIPIE), 1,8-bis(dimethylamino)naphthalene, N,N,N',N'-tetramethyl-o-phenylenediamine (TMOPDA), 1,2-dipyrolidinoethane (DIPYE), 1,3-dipiperidinopropane (DIPIP), 1,2-bis(2,6-dimethylpiperidino)cyclohexane (BDMPC), sparteine, and the like.

The ethylene polymerization reaction can be carried out at 0° C. to 100° C., preferably 25° C. to 60° C. The ethylene pressure can be from 10 psig to 1000 psig, preferably 100 to 500 psig. The polymerization time can run from 10 minutes to 2 hours, preferably 30 minutes to 1 hour.

When the polymerization of the ethylene is complete, living polyethylene blocks are present in the polymerization mixture. These are perfectly linear polyethylene-alkyllithiums. These living polyethylenes are then reacted with cyclicsiloxane monomers $(R_1R_2SiO)_n$, where n=3–10, $R_1$ and $R_2$=alkyl ($C_1$–$C_{20}$), alkenyl ($C_2$–$C_{20}$), hydrogen, benzyl or phenyl (including alkyl substituted aromatics and polycyclics) and $R_1$ and $R_2$ can be the same or different. Specific siloxane monomers include $(Me_2SiO)_3$, $(MeHSiO)_3$, $(Me_2SiO)_4$, $(Me_2SiO)_5$, $(MeHSiO)_4$, $(MeHSiO)_5$, $(Ph_2SiO)_3$, $(Ph_2SiO)_4$, $(Ph_2SiO)_5$, $(PhHSiO)_4$, $(PhHSiO)_5$, $(PhHSiO)_3$, $(vinylmethylSiO)_4$, $(vinylmethylSiO)_5$, $(vinylHSiO)_3$, $(vinylHSiO)_4$, $(vinylHSiO)_5$, $(vinylmethylSiO)_3$, $(PhMeSiO)_3$, $(PhMeSiO)_4$, $(PhMeSiO)_5$. Mixtures of monomers can also be used. Preferably, the monomer is hexamethylcyclo-trisiloxane ($D_3$) or octamethylcyclotetrasiloxane ($D_4$).

This polymerization is carried out in the presence of a polar promoter, including, but not limited to, the promoter present during the ethylene polymerization step. Additional promoter can be added. Such promoters include but are not limited to diethers and/or diamines, such as diethylglyme and/or TMEDA, cyclic ethers such as tetrahydrofuran, and any promoter known to be useful in anionic polymerizations. It's purpose is to decrease the reaction time of the $D_3$ polymerization. Preferably, this reaction is carried out at a temperature of from 30° C. to 120° C., the concentration of the cyclic siloxane monomer (described herein in terms of hexamethylcyclotrisiloxane) is from 1 to 80 percent by weight and the amount of promoter used ranges from 100 ppm to essentially 100 percent by weight (i.e., the polar promoter is used as solvent). The temperature range is important because higher temperatures cause more rapid reaction. The promoter concentration range is important for the same reason. The reaction may be carried out at up to 80 weight percent solids, preferably 10 to 80 percent. This is advantageous because higher sol ids offer economic advantages because less solvent is necessary.

The living block copolymer can be recovered directly to give PE-PDMS-O⁻Li⁺ which is a living polymer and has not been terminated. One could manufacture and sell the living polymer itself to others who could then react it to form other polymers and/or add other functionalities. Termination of the polymer may be achieved by several conventional means. If desired, the polymer can be capped with $R_3R_4R_5SiX$, e.g., to give PE-PDMS-$SiR_3R_4R_5$ where the R's can be alkyl, alkenyl ($C_2$ to $C_{20}$, preferably a vinyl group because of its high reactivity), phenyl, benzyl, hydrogen, and the like, and can be the same or different, and X is halogen, preferably chlorine, or alkoxide, preferably $C_1$–$C_{20}$. It can be protonated with, e.g., acetic acid, to give PE-PDMS-OH. It can also be coupled with, e.g. $SiCl_4$, $Me_2SiCl_2$ HSi(OMe)$_3$, with coupling agent functionalities from 2 to about 12 to give (PE-PDMS)$_n$, where n=the number of coupling agent functionalities. The coupling or capping reaction can be carried out from 40° to 100° C. for 5 minutes to 1 hour, preferably 70° to 100° C. for about 10 to 15 minutes.

One of the keys to the uniqueness of this invention is related to the characteristics of the polymerization kinetics and thermodynamics of cyclic siloxane monomers. With many well-known anionically polymerizable monomers such as 1,3-dienes, styrene, methacrylate esters, etc., the reactions are extremely fast and extremely exothermic in the presence of RLi/diamine initiator systems such as the PE-Li/diamine of this invention. This can lead to crossover problems for the second monomer with the precipitated PE-Li chain ends. If the kinetics of polymerization are too fast, all of the second monomer may be consumed by the first fraction of PE-Li chains to react (and solubilize), thus leaving unreacted those precipitated chains which were inaccessible to the second monomer over the timeframe of the second monomer polymerization step. This will result in missed molecular weight (MW) targets, broad molecular weight distributions (MWD), and contamination with substantial amounts of unreacted homo-PE. Uncontrollable exotherms may also be a problem with these monomers which have a large heat of reaction.

In contrast, the cyclic siloxane monomers have moderate polymerization kinetics compared to the above-mentioned monomers and have very low heats of reaction since they are ring-opening polymerizations (no net new bonds are created). The result is that reaction heat can be controlled easily and all the precipitated PE-Li chain ends appear to have sufficient time to participate in the $D_3$ polymerization step well before all the $D_3$ monomer is consumed. Thus, homo-PE contamination is minimized in the desired products. It is this balance of monomer properties vs. other anionic monomers that has led to the unique polymers and processes of this invention and which has overcome previous limitations of this technology.

The block copolymers of this invention have an overall weight average molecular weight of from 1500 to 100,200, preferably from 2000 to 20,000 and most preferably from 2000 to 10,000. The polyethylene blocks have weight average molecular weights of from 200 to 15,000, and most preferably from 1000 to 6000. The weight average molecular weights of the PDMS blocks vary from 500 to 100,000, preferably 1000 to 20,000, and most preferably 1000 to 10,000.

These polymers are useful as extruder processing aids with polyolefins, especially polyethylene, engineering thermoplastics such as nylon, e.g., and styrenic block copolymers such as KRATON® thermoplastic elastomers. They are also useful in coatings for low surface energy applications since their low MW and low viscosity allows for efficient melt diffusion to the surface.

EXAMPLES

Example 1

PE Polymerization 350 g of cyclohexane (previously treated with 4A mole sieves) and 20 mmoles of N,N,N',N'-tetramethylethylenediamine (TMEDA) were premixed, added to a 1 liter autoclave and purged with nitrogen for 5 minutes. To this was added 20 mmoles of n-butyl lithium (n-BuLi). The autoclave was pressured to 250 psig with ethylene gas and the reaction was allowed to exotherm from ambient temperature to 60° C. and then maintained at that temperature. A total of 100 g of ethylene was added over a 1 hour reaction period. A sample of PE was withdrawn (terminated with isopropanol) for GPC and melting point determinations. All PE polymerizations in subsequent examples were conducted similarly with reaction parameters tabulated in Table 1. At the end of this polymerization step, the living PE-Li is present as a low viscosity slurry with the exception of example 9 (85° C.) where it was in solution as a high viscosity cement. About 100g of ethylene and 350g of cyclohexane solvent were used in all the examples (except Example 5 which used 600 g of cyclohexane in a 2 liter reactor). TMEDA was used as promoter in Examples 1–6 and 14. Dipiperidinoethane (DIPIE) was used as the promoter in Examples 7–11.

Purification of hexamethylcyclotrisiloxane monomer ($D_3$)

A 50 percent by weight solution of $D_3$ in treated cyclohexane was prepared, treated with hot 4A mole sieves and alumina for 1 hour under agitation, filtered and stored under nitrogen. This procedure was standard although satisfactory results can be obtained by using $D_3$ as received from vendors (purity 95–99%).

Crossover reaction from living PE-Li block to the PDMS block and polymerization of the PDMS block 90 g of $D_3$ in cyclohexane was added to the PE-Li$^+$ in the autoclave and the reaction temperature was raised to 90° C. over a 15–30 minute period at which time the yellow color of the living PE-Li$^+$ dissipated and the reactor contents are completely dissolved. Then 5 g of diethyleneglycoldiethylether (DIOXO) was added (about 1 percent weight of total reaction solution) and the reaction continued for 2–3 hours. Then the PE-PDMS block copolymer was capped with 20 mmoles of Me$_3$SiCl (15 minutes at 90° C.) and recovered by removing solvent under vacuum overnight. The sample was analyzed by NMR for the PE-PDMS composition and differential scanning calorimeter (DSC) to determine the melting point. Results for this example and other examples are tabulated in Table 2. $D_3$ polymerization conditions for other examples were similar with the significant differences noted in the specific examples.

Example 2

1. PE polymerization conditions are described in Table 1.
2. Add 150 g $D_3$ in cyclohexane and raise the temperature to 90° C.
3. Add log DIOXO and react 2 hours at 90° C.
4. Cap with Me$_3$SiCl for 15 min. at 90° C. and isolate product.
5. Results tabulated in Table 2.

Example 3

1. PE polymerization conditions are described in Table 1.
2. Add 150 g $D_3$ in cyclohexane and raise the temperature to 90° C.
3. Add 50 g $D_3$ in 50 g dry tetrahydrofuran and react 2 hours @ 90° C.
4. Cap with 90 mmoles Me$_3$SiCl for 15 minutes at 90° C. and isolate product.
5. Results tabulated in Table 2.

Example 4

1. Identical to Example 3 but couple with Me$_2$SiCl$_2$.

Example 5

1. PE polymerization conditions described in Table 1.
2. Add 150 g $D_3$ in cyclohexane and raise the temperature to 90° C.
3. Add 16 g DIOXO and react @ 90° C. for 2 hours.
4. Withdraw 300 g of the solution from the reaction (Example 5A) and isolate product. This PE-PDMS polymer is uncapped (≡Si-OLi chain end).
5. Add 100 g $D_3$ in cyclohexane to reactor and react 2 additional hours @ 90° C.
6. Cap with 40 mmoles Me$_3$SiCl for 30 minutes @ 90° C. and isolate product (Example 5B).
7. Results for Examples 5A and 5B are in Table 2.

Example 6

1. PE polymerization conditions are in Table 1.
2. Add 80 g $D_3$ in cyclohexane and raise the temperature to 90° C.
3. Add 120 g $D_3$ and 30 g DIOXO in cyclohexane, react for 2 hours @ 90° C., and then couple with 23 mmoles HSi(OMe)$_3$ for 1 hour @ 90° C. and isolate product.
4. Results are in Table 2.

Example 7: Kinetics Study

1. PE polymerization conditions are in Table 1.

2. Add 143 g $D_3$ in cyclohexane and raise the temperature to 90° C. over 20 minute period. Withdraw sample and determine the concentration of $D_3$ [$D_3$] by gas-liquid chromatography (glc). Results indicate that 87 percent of the charged $D_3$ is reacted while the temperature is being raised to 90° C. in 20 minutes.

3. Add 16 g DIOXO and react @ 95° C. for 3 hours. Pull samples every 30 minutes and determine [$D_3$] by glc. Final conversion of $D_3$=99 percent reacted. Results indicate that the reaction is approximately first order in [$D_3$] with $t_{1/2}$ about 27 minutes @ 95° C.

4. Isolate final product (uncapped); results are in Table 2.

Example 8

1. PE polymerization conditions are described in Table 1.
2. Add 58 g $D_3$ in cyclohexane and raise the temperature to 90° C.
3. Add 130 g $D_3$ and log DIOXO in cyclohexane and react for 3 hours @ 90° C. Withdraw 300 g of solution from reactor and isolate product (uncapped) (Example 8A).
4. Add 20 mmoles $Me_3SiCl$ and cap 30 minutes @ 90° C. Isolate product (Example 8B).
5. Results for Examples 8A and 8B are in Table 2.

Example 9

1. PE polymerization conditions are described in Table 1.
2. Add 60 g $D_3$ in cyclohexane and raise the temperature to 90° C.
3. Add 60 g $D_3$ and log DIOXO in cyclohexane and react for 3 hours @ 90° C. Withdraw 300 g solution from the reactor (uncapped) and isolate product (Example 9A). Polymer yield indicated about 95 percent conversion of $D_3$.
4. Add 20 mmoles $Me_3SiCl$ to reactor, cap 30 for minutes @ 90° C., and then isolate the product (Example 9B).
5. Results for Examples 9A and 9B are in Table 2.

Example 10

1. PE polymerization conditions are in Table 1.
2. Add 60 g $D_3$ in cyclohexane and raise the temperature to 90° C.
3. Add 60 g $D_3$ and log DIOXO in cyclohexane and react for 3 hours @ 90° C., then isolate product (uncapped).
4. Results are in Table 2.

Example 11

1. PE polymerization conditions are described in Table 1.
2. Add 100 g $D_3$ in cyclohexane and raise the temperature to 90° C. Then add 10 g DIOXO and react for 1 hour @ 90° C. Withdraw 300 g solution from reactor and isolate product (Example 11A, uncapped).
3. Add 100 g $D_3$ in cyclohexane to reactor and react 1 hour @ 90° C. then isolate product (Example 11B, uncapped).
4. Results are in Table 2.

Example 12 (Comparative Example 1)

Examples 1–11 describe PE-PDMS block copolymers in which the PE block is perfectly linear (high density polyethylene-HDPE). This comparative example describes the prior art method of preparing PE-PDMS block copolymers in which the PE block contains about 8 percent comonomer or branching (low density polyethylene-LDPE). Thus the properties of the invention HDPE-PDMS and prior art LDPE-PDMS block copolymer can be compared.

Prior art (British Patent No. 1376446) teaches that LDPE-PDMS polymers can be synthesized by anionically polymerizing polybutadiene(PBD)-PDMS block copolymers followed by hydrogenation of the PBD-PDMS polymer to LDPE-PDMS materials: Thus, a PBD-PDMS diblock polymer was prepared by conventional anionic techniques (PBD MW=6000; PDMS MW=4900). This was hydrogenated to the material denoted as Example 12 in Table 2. The hydrogenation catalyst was prepared by reacting $Ni(2\text{-ethylhexanoate})_2$ with triethyl aluminum in cyclohexane (Al:Ni= 2.0:1 molar). The hydrogenation reaction was carried out @ 90° C. and 700 psig hydrogen pressure with 500 ppm Ni over 3 hours on a 5 percent weight solution of PBD-PDMS precursor polymer in cyclohexane solvent. Final conversion of th PBD block to LDPE was 98–99 percent conversion (by ozonolysis of residual olefin in the hydrogenated polymer). Hydrogenation catalyst residues were removed by contacting the LDPE-PDMS solution with aqueous methanolic HCl, phase separating the organic layer, and recovering the LDPE-PDMS product by removing solvent under vacuum overnight. The LDPE-PDMS results are tabulated in Table 2, Example 12.

Example 13 (Comparative Example 2)

Two homo-PBD samples were prepared by anionic polymerization methods (MWs=1600 and 6800, respectively) to be hydrogenated for use as GPC standards and for melting point determination for LDPE for comparative purposes to the M.P.'s for HDPE described in Table 1. These materials were mixed on a 1:1 weight basis, hydrogenated, extracted, and recovered as described in Example 12. The LDPE so formed had MW=5000 and Q=5.5 (polydispersity). This serves as a useful comparison both for the HDPE blocks of the present invention and for the LDPE block of Example 12 (see Table 1).

Example 14

The PE polymerization conditions are described in Table 1. This experiment demonstrates that even at very low ratios (1:10) of promoter to RLi, the anionic polymerization proceeds smoothly. A large quantity of HDPE powder was recovered from this reaction (MW=1600; Q=1.4).

Example 15 (Comparative Example 3)

Melting points (M.P.'s) were determined on a number of additional PE copolymers for comparison purposes. These are commercially available materials with varying amounts of butene-1 comonomer. Results are tabulated in Table 3 and compared to the polymers of this invention.

Example 16 (Comparative Example 4)

Some key properties of polyethylene-polysiloxane graft copolymers were also determined (SILGRAFT® 210 and SILGRAFT® 250 polymers). These can be compared to the new polymers of this invention and to comparative example 1. The M.P.s of SILGRAFT® 210 and SILGRAFT® 250 polymers were measured to be 107° C. and 125° C. respectively vs. 106° C. for comparative example 1 and 114° to 126° C. for the polymers of this invention for which PE block MW data is available (exs. 5A–11B).

Melt Flow Index (MFI) values were also determined for representatives of all three classes of polymers at 190° C. and at two load levels. High melt flow values (low melt viscosity) are desirable for melt processing ease, for compatibilizer applications, and for effective diffusion in polymer blends where low surface energy materials are sought (coatings). The melt flow data is presented in Table 4. Comparative example 4 has very low melt flow values (>2 orders of magnitude lower than example 7 of this invention and comparative example 1) and therefore would be expected to be considerably more difficult to process.

TABLE 1

Ethylene Polymerization Reactions

| Ex. No. | mmoles n-BuLi | mmoles Promoter | $T_o$-$T_f$[a] (°C.) | Pressure (psig) | Reaction time (min) | PE M.P. (°C.) |
|---|---|---|---|---|---|---|
| 1 | 20 | 20 | 25–60 | 250 | 60 | — |
| 2 | 60 | 60 | 25–55 | 250 | 55 | — |
| 3 | 90 | 90 | 25–60 | 300 | 60 | — |
| 4 | 90 | 90 | 25–60 | 250 | 60 | — |
| 5 | 80 | 80 | 25–60 | 250 | 60 | — |
| 6 | 80 | 80 | 25–40 | 60 | 120 | 121 |
| 7 | 22 | 20 | 25–60 | 350 | 60 | 129 |
| 8 | 22 | 20 | 25–40 | 400 | 60 | — |
| 9 | 30 | 30 | 25–85 | 400 | 30 | 130 |
| 10 | 30 | 30 | 25–40 | 400 | 45 | 127 |
| 11 | 60 | 60 | 25–50 | 300 | 60 | 127 |
| 13 | Compar. Ex. 2 | | | | | 87–107 (broad) |
| 14 | 30 | 3 | 25–60 | 200 | 90 | — |

[a]$T_o$ = initial temperature; $T_f$ = final temperature.

TABLE 3

| Material | Comonomer[a] Content (%) | PE Type | M.P. (°C.) |
|---|---|---|---|
| EXACT ® 4033 | ~20% | LDPE | 66 |
| EXACT ® 4011 | ~17% | LDPE | 73 |
| EXACT ® 3028 | ~11% | LDPE | 97 |
| EXACT ® 3025 | ~7% | LDPE | 107 |
| COMPARATIVE EX. 1 (EX. 12) | 6–8% | LDPE | 106 |
| COMPARATIVE EX. 2 (EX. 13) | 6–8% | LDPE | 107 |
| THIS INVENTION (EX's 6–11) HOMO-PE BLOCK | 0 | HDPE | 121–130 |
| THIS INVENTION (EX's 2–11) PE-PDMS | 0 | HDPE | 107–126 |

[a]by ASTM D-2238 [Method B]

TABLE 4

| Polymer | MFI-1[a] | MFI-2[b] |
|---|---|---|
| Silgraft ® 250 (Comparative Ex. 4) | 0.90 | No Flow |
| Ex. 7 (this invention) | >300 | 129 |
| Ex. 12 (Comparative Ex. 2) | >300 | 131 |

[a]2.16 Kg load @ 190° C.: grams/10'
[b]0.33 Kg load @ 190° C.: grams/10'

SUMMARY OF RESULTS

A summary of key properties of the materials of this invention and the two types of comparative polymers are presented in Table 5.

TABLE 2

PE–PDMS Polymers

| Example No. | ($M_w$) k = 1000 | $Q\left(\dfrac{Mw}{Mn}\right)$ | % wt[b] PE | PDMS[b] $M_w$ | PE-PDMS $M_w$S | M.P. (°C.)[c] PE-PDMS | Comment |
|---|---|---|---|---|---|---|---|
| 1 | — | — | 45 | — | — | — | Me₃SiCl |
| 2 | — | — | 62 | — | — | 112 | Me₃SiCl |
| 3 | — | — | 30 | — | — | 107 | Me₃SiCl |
| 4 | — | — | 42 | — | — | 109 | Me₂SiCl₂ |
| 5A | 3.0K | 2.0 | 49 | 3.1K | 3K–3.1K | 116 | Uncapped |
| 5B | 3.0K | 2.0 | 27 | 8.1K | 3K–8.1K | 114 | Me₃SiCl |
| 6 | 1.6K | 2.2 | 30 | 3.7K | 1.6K–3.7K | 114 | HSi(OMe)₃ |
| 7 | 4.3K | 2.1 | 33 | 8.6K | 4.3K–8.6K | 122 | Uncapped |
| 8A | 3.0K | 2.0 | — | — | — | 120 | Uncapped |
| 8B | 3.0K | 2.0 | 15 | 17K | 3K–17K | — | Me₃SiCl |
| 9A | 4.1K | 4.6 | — | — | — | 125 | Uncapped |
| 9B | 4.1K | 4.6 | 43 | 5.4K | 4.1K–5.4K | 126 | Me₃SiCl |
| 10 | 3.7K | 5.3 | 28 | 9.5K | 3.7K–9.5K | 124 | Uncapped |
| 11A | 3.0K | 3.8 | 59 | 2.1K | 3.0K–2.1K | 123 | Uncapped |
| 11B | 3.0K | 3.8 | — | — | — | 122 | Uncapped |
| 12 | 6K | 1.1 | 55 | 4.9K | 6K–4.9K | 83–106 (Broad) | Comparativ Example 1 |
| 16A | SILGRAFT 210 | — | — | — | — | 107 | Comparative Example 4 |
| 16B | SILGRAFT 250 | — | 50 | — | — | 125 | Comparative Example 4 |

[a]by GPC: o-dichlorobenzene @ >100° C; true $M_w$ determined vs. PE standard (Example 13).
[b]by proton NMR: melt phase @ 130–150° C.
[c]by DSC

TABLE 5

| Polymer Type | Melt Flow Index | Melting Point |
| --- | --- | --- |
| This invention | High | High |
| Comparative Ex. 1 | High | Low |
| Comparative Ex. 4 | Low | High |

Only the novel materials of this invention combine an optimum balance of key property parameters.

Example 17

The conclusions below were based on data collected from wax coatings containing one percent PE-PDMS (PEPSi) block copolymer dissolved in the wax. The experiments were performed by heating the wax to above 200° C., dissolving the PEPSi polymer into the wax with stirring and coating the wax while hot onto kraft paper. When the wax cools, the release paper is tested by adhering a piece of packaging tape to the coating, and measuring the 180 degree peel force required to remove the tape with an Instron. The table below compiles the results thus generated for a number of PEPSi polymer structures. The molecular weights are weight average.

TABLE 6

PEPSi Polymer Properties, and Release Performance as Blends With Wax

| Polymer | PE MW | PE (wt. %) | Tri or Diblock | MW | 180° Peel @ 1% | Conclusion |
| --- | --- | --- | --- | --- | --- | --- |
| 5A | 3000 | 49 | D | 6100 | 77.1 | works |
| 5B | 3000 | 27 | D | 11100 | 77.1 | works |
| 6 | 1600 | 30 | T | 8851 | 63.5 | works |
| 7 | 4300 | 33 | D | 12900 | 145.2 | NO |
| 8A | 3000 | 15 | D | 20000 | 90.6 | works |
| 8B | 3000 | 15 | D | 20000 | 45.3 | works |
| 9B | 4100 | 43 | D | 9500 | doesn't melt | NO |
| 10 | 3700 | 28 | D | 13200 | 66.5 | works |
| 11A | 3000 | 59 | D | 5100 | 287 | NO |
| 11B | 3000 | 32 | D | 9300 | 106 | works |
| 12 | 6000 | 55 | D | 10900 | doesn't melt | NO |

The criterion for a successful release coating is that the peel force be less than 125 g/inch. Based on this criterion the last column of the table gives the conclusion as to whether or not the particular PEPSi polymer successfully generated an adequate wax release coating or not. Based on the conclusions listed the following two criteria for the polymer must be satisfied.

1) PE block must be less than 4100 molecular weight, and
2) PE content of block copolymer must be less than 55%.
3) Additionally, the overall molecular weight should be 1500 to 100,000, preferably 1500 to 50,000.

For all polymers in the table that satisfy the above requirements successful release coatings were generated. The molecular weight in the table above was calculated assuming that the tri-block polymers are 66% coupled. The molecular weight listed is then a weighted average of 66% tri-block, and 34% di-block polymer. The 66% coupling number was a reasonable estimate from GPC curves.

Example 18

Alternatively, release surfaces can be prepared by extruding films containing the PEPSi block copolymer mixed with a film grade polymer. The PEPSi polymer was mixed with low density polyethylene (Rexene 1017) using a Brabender Prep mixer with Banbury type mixing blades rotating at 10 rpm for 10 minutes at 160° C. The mixture was granulated and then added to the hopper of a Killion single-screw extruder having a 1 in. screw diameter and 25:1 length to diameter ratio. The mixture was extruded as a single-layer film using a Killion ABC feedblock and an Extrusion Die Incorporated (EDI) 6 in. sheet and film die. The temperature of the feedblock and die was set at 450° F. These release films were evaluated by recording the 180° peel force generated as a solvent acrylic tape was peeled from the film. The measured values are given in the table below for films containing 1% addition of the PEPSi polymer.

TABLE 7

Data Generated From Extruded Films

| Polymer | PE MW | PE (wt. %) | Tri or Diblock | MW | 180° Peel @ 1% | Conclusion |
| --- | --- | --- | --- | --- | --- | --- |
| 2 | 1000 | 29 | D | 3500 | 81 | works |
| 3 | 1000 | 30 | D | 3600 | 124.1 | works |
| 4 | 1000 | 42 | T | 6012 | 72.8 | works |
| 5A | 3000 | 49 | D | 6100 | 53.3 | works |
| 5B | 3000 | 27 | D | 11100 | 79.8 | works |
| 6 | 1600 | 30 | T | 8851 | 83.9 | works |
| 7 | 4300 | 33 | D | 12900 | 149.9 | NO |
| 8A | 3000 | 15 | D | 20000 | 205.1 | NO |
| 8B | 3000 | 15 | D | 20000 | 138.3 | NO |
| 10 | 3700 | 28 | D | 13200 | 224.5 | NO |

The data in Table 2 are presented in a similar fashion to the data of Table 1. Based on the criteria that release must be less than 125 g/in for a successful release surface, all polymers meet the requirement except for 7, 8A, 8B, and 10. Therefore, the polymer can be defined as being appropriate for extrudable film release applications if it meets the following two criteria:

1) PE block must be less than 3700 MW, and
2) Total polymer molecular weight must be less than 20,000.

Again, similar to Table 1, the total molecular weight of the polymer is calculated for the tri-block polymers as a weighted average assuming the polymers are 66% tri-block and 34% di-block.

We claim:

1. A living anionically polymerized block copolymer for use in wax release coatings exhibiting a 180° peel force of less than 125 g/inch, said copolymer having an overall weight average molecular weight of 1500 to 100,000 and comprised of at least one anionically polymerized block of polyethylene having a weight average molecular weight of less than 4100 and at least one anionically polymerized block of a cyclic siloxane monomer or mixtures of such monomers, wherein the polyethylene content of the polymer is less than 55% by weight.

2. The copolymer of claim 1 wherein the cyclic siloxane monomer has the formula:

$(R_1R_2SiO)_n$ wherein n is from 3 to 10 and $R_1$ and $R_2$ may be alkyl ($C_1$–$C_{20}$), alkenyl ($C_2$–$C_{20}$), hydrogen, benzyl, phenyl, alkyl substituted aromatics, or polycyclics, and may be the same or different.

3. The copolymer of claim 2 wherein the cyclic siloxane monomer is hexamethylcyclotrisiloxane.

4. The copolymer of claim 2 wherein the cyclic siloxane monomer i s octamethyl cyclotetrasiloxane.

5. The copolymer of claim 2 wherein the copolymer has at least one block of high density polyethylene having a weight average molecular weight of 1000 to 6000 and at least one block of polysiloxane having a weight average molecular weight of 1000 to 10,000.

6. The copolymer of claim 1 wherein the living polymer chain has been terminated.

7. The copolymer of claim 6 which has been capped with a terminating agent having the formula:

$$R_3R_4R_5SiX$$

wherein $R_3$, $R_4$, and $R_6$ can be alkyl ($C_1$–$C_{20}$), alkenyl ($C_2$–$C_{20}$), phenyl, hydrogen, or benzyl, and X is halogen or alkoxide.

8. The copolymer of claim 6 which has been protonated to form a hydroxy functional copolymer.

9. The copolymer of claim 6 which has been coupled with a coupling agent and contains from 2 to 12 block copolymer arms.

10. The copolymer of claim 1 which has been coupled with a coupling agent and contains from 2 to 12 block copolymer arms.

11. The copolymer of claim 1 wherein the overall weight average molecular weight is from 1500 to 50,000.

12. A living anionically polymerized block copolymer for use in release coatings prepared by extruding a release film comprising a blend of said copolymer and a film grade polymer, said release coating exhibiting a 180° peel force of less than 125 g/inch, said copolymer having an overall weight average molecular weight of less than 20,000 and comprised of at least one anionically polymerized block of polyethylene having a weight average molecular weight of less than 3700 and at least one anionically polymerized block of a cyclic siloxane monomer or mixtures of such monomers.

13. The copolymer of claim 12 wherein the cyclic siloxane monomer has the formula:

$$(R_1R_2SiO)_n$$

wherein n is from 3 to 10 and $R_1$ and $R_2$ may be alkyl ($C_1$–$C_{20}$), alkenyl ($C_2$–$C_{20}$), hydrogen, benzyl, phenyl, alkyl substituted aromatics, or polycyclics, and may be the same or different.

14. The copolymer of claim 13 wherein the cyclic siloxane monomer is hexamethylcyclotrisiloxane.

15. The copolymer of claim 13 wherein the cyclic siloxane monomer is octamethylcyclotetrasiloxane.

16. The copolymer of claim 13 wherein the copolymer has at least one block of high density polyethylene having a weight average molecular weight of 1000 to 6000 and at least one block of polysiloxane having a weight average molecular weight of 1000 to 10,000.

17. The copolymer of claim 12 wherein the living polymer chain has been terminated.

18. The copolymer of claim 17 which has been capped with a terminating agent having the formula:

$$R_3R_4R_5SiX$$

wherein $R_3$, $R_4$, and $R_5$ can be alkyl ($C_1$–$C_{20}$), alkenyl ($C_2$–$C_{20}$), phenyl, hydrogen, or benzyl, and X is halogen or alkoxide.

19. The copolymer of claim 17 which has been protonated to form a hydroxy functional copolymer.

20. The copolymer of claim 17 which has been coupled with a coupling agent and contains from 2 to 12 block copolymer arms.

21. The copolymer of claim 12 which has been coupled with a coupling agent and contains from 2 to 12 block copolymer arms.

* * * * *